July 23, 1929.  T. WINKLER  1,721,653
TRAP
Filed June 11, 1928
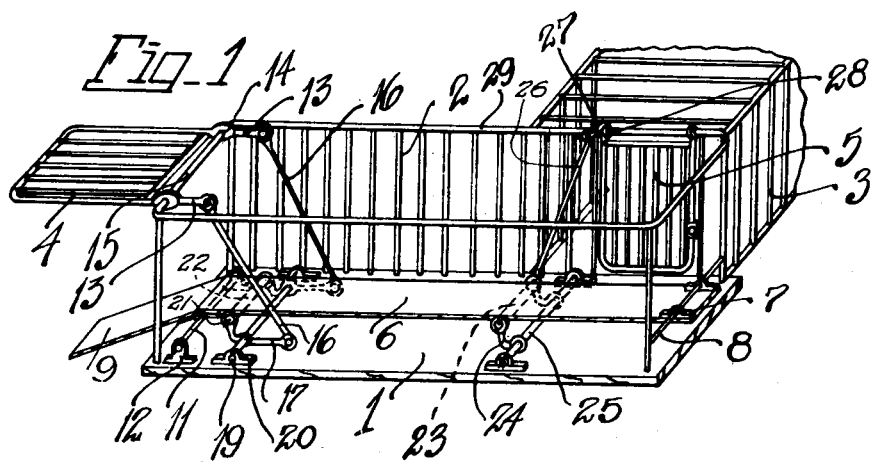
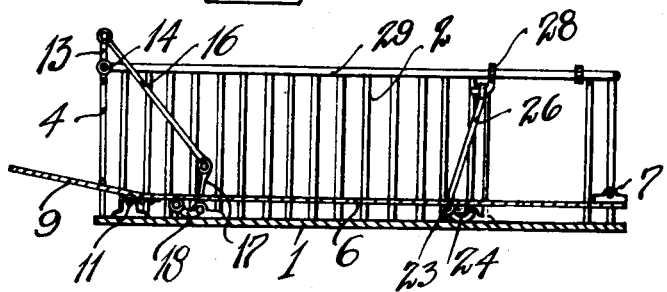
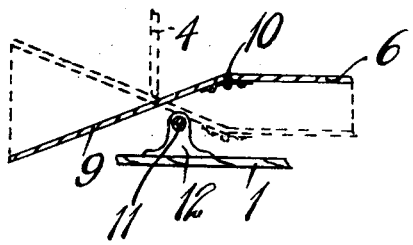
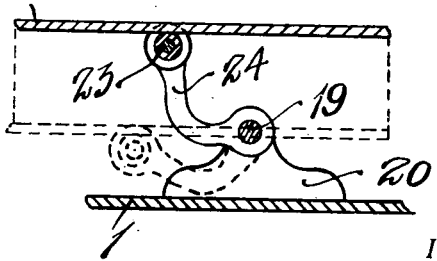
Inventor
Thomas Winkler
By Herbert E. Smith
Attorney Patented July 23, 1929.

1,721,653

UNITED STATES PATENT OFFICE.

THOMAS WINKLER, OF SEATTLE, WASHINGTON.

TRAP.

Application filed June 11, 1928. Serial No. 284,305.

My present invention relates to improvements in traps designed for use in trapping numerous varieties of smaller animals, and the trap is particularly fashioned for trapping and confining a number of animals. In carrying out my invention, I provide two compartments, the first one being a trap for the animal, and the second compartment being a trap or cage for retaining a number of animals which may successively be admitted thereto. In carrying out my invention, I provide a plurality of trap doors, one of which is normally open and the other normally closed, for the two cages or compartments of the trap, and these doors are operated by the weight of the animal upon a movable floor. Means are provided for transmitting the movement of the floor to the gates or trap doors for closing the outer door after the animal has entered the first cage and opening the inner door to permit the animal to enter the second cage. Means are provided whereby the movable floor is operated after the animal has entered the second cage, for closing the inner door and opening the outer door, thus resetting the trap for a second and for successive animals to enter.

The invention consists in certain novel combinations and arrangements of parts as will hereinafter be more fully set forth and claimed.

In the accompanying drawings, I have illustrated one complete example of the physical embodiment of my invention wherein the parts are combined and arranged according to the best mode I have so far devised for the practical application of the principles of my invention.

Figure 1 is a perspective view of the trap partly broken away and parts being omitted for convenience of illustration, the trap being set in position to receive an animal;

Fig. 2 is a longitudinal, vertical sectional view through the first cage with the trap in locked or closed position;

Fig. 3 is a detail sectional view of the movable floor showing it in dotted lines in locked position with the entrance door closed; and Fig. 4 is a detail sectional view showing the actuating means depressed by the movable floor for operating the doors.

In carrying out my invention, I utilize a baseboard 1 of suitable size and upon the baseboard are supported two cages 2 and 3 which are located at right angles to each other and provided with doors 4 and 5. In Fig. 1, I have omitted parts of the enclosure in order that the operating and actuating mechanism may be illustrated, but it will be understood that suitable means are provided for enclosing all parts of the two cages with the exception of the doorways or openings for the doors 4 and 5.

The outer door 4 is normally open and the inner door 5 is normally closed when the trap is in set position, and these doors are operated by means of a depressible elevated floor 6 which is spaced above the baseboard 1 and pivoted at 7 on the cross bar 8 located at the rear of the first cage 2. At the front end of the depressible floor and projecting through the front doorway, I provide an extension 9 of the floor which forms an inclined entrance or gangway to the first cage for the animal to pass over. This floor extension is hinged at 10 to the floor and rests on a cross bar 11 which is supported in brackets 12 at the outer or front entrance of the cage 2. While the trap is in set position, the extension 9 is spaced above the cross bar 11 as indicated in Fig. 3, but when the floor 6 has been depressed, the extension rests on the cross bar 11 with the hinge 10 below the level of the cross bar, thus swinging the extension upwardly at an angle as shown in dotted lines in Fig. 3 to retain the door 4 in closed position.

The door 4 is pivoted at its upper end and is provided with a pair of spaced crank arms 13 which are pivoted at 14 on the upper cross bar 15 of the cage 2. In set position, the door extends outwardly in a horizontal plane as in Fig. 1, and in closed position the door swings down into a vertical plane. The crank arms 13 are each provided with a side link 16 and these links extend down below the depressible floor and are pivoted to arms 17 of bell crank levers 18 which are spaced at the sides of the first cage and pivoted on a bar 19 which extends parallel with the bar 11 and is supported in brackets 20 from the baseboard 1. The two bell crank levers are connected by a cross bar 21 and this cross bar has thereon a roller 22 which extends the full width of the depressible floor and contacts with its under surface. From this description taken in connection with the drawings, it will be apparent that when the weight of the animal is caused to depress the movable floor, the latter swings downwardly at its front end in contact with the roller 22 and the bell crank levers through the links 16 swing the door 4 to closed position. After the door swings to vertical position, the extension 9 of the floor swings upwardly and engages the lower edge of the door to hold the latter in locked vertical position, thus enclosing the animal within the first cage.

The depressing movement of the floor which closes the outer door also causes opening of the normally closed inner door 5. For this purpose, I utilize a second depressible roller 23 and crank arms 24, the latter on a rock shaft 25 which extends transversely of the first cage and longitudinally of the second cage, at one side of and in front of the door 5. One of the crank arms 24 is connected by a link 26 to an upper arm 27 which is rigid with the door 5 and this arm is pivoted at 28 on the upper bar 29 that extends transversely of the opening for door 5. Thus through the depressing movement of the floor, the arms 24 are swung downwardly and through the link connection the door 5 is swung open as the door 4 is closed. When the animal attempts to escape and finds the outer door 4 closed, he enters through the open doorway of the second cage 3 and after his weight has been removed from the floor, the latter swings upwardly on its bearing 7 and the release of the load from the two rollers 22 and 23 permits the door 4 to be swung to open position and the door 5 to be swung to closed position. This resetting of the doors may be accomplished in suitable manner as by means of weights or springs.

From the above, it will be apparent that the trap is automatically reset after an animal has been trapped and in this manner, the second cage may be used for trapping a number of animals, each of which successively passes through the first cage 2 into the second cage, and when the latter is loaded to capacity of course it may be emptied in suitable manner.

Having thus fully described my invention, what I claim as new and desire to secure by Letters Patent is—

1. The combination in a trap comprising a pair of cages with a normally open door and a normally closed door for said cages, of a hinged depressible floor having an exterior hinged extension, means actuated by the depressing movement of the floor for closing the front door, and means for moving said extension to position to lock said front door.

2. The combination in a trap with a pair of cages one having a normally open door and the other having a normally closed door, of a hinged, horizontally depressible floor, a front exterior extension hinged to the floor, means actuated by the depressible floor for closing the front door and means actuated by said floor for opening the second door, and means for resetting the trap when the weight of the animal is removed from said floor.

3. The combination in an animal trap with a cage having a hinged door, of a depressible hinged floor having a hinged extension exterior of the cage, a depressible cross bar and bell crank levers therefor, a roller on the cross bar for coaction with the floor, links connecting the bell crank levers with the door, and means for resetting the door.

In testimony whereof I affix my signature.

THOMAS WINKLER.